UNITED STATES PATENT OFFICE.

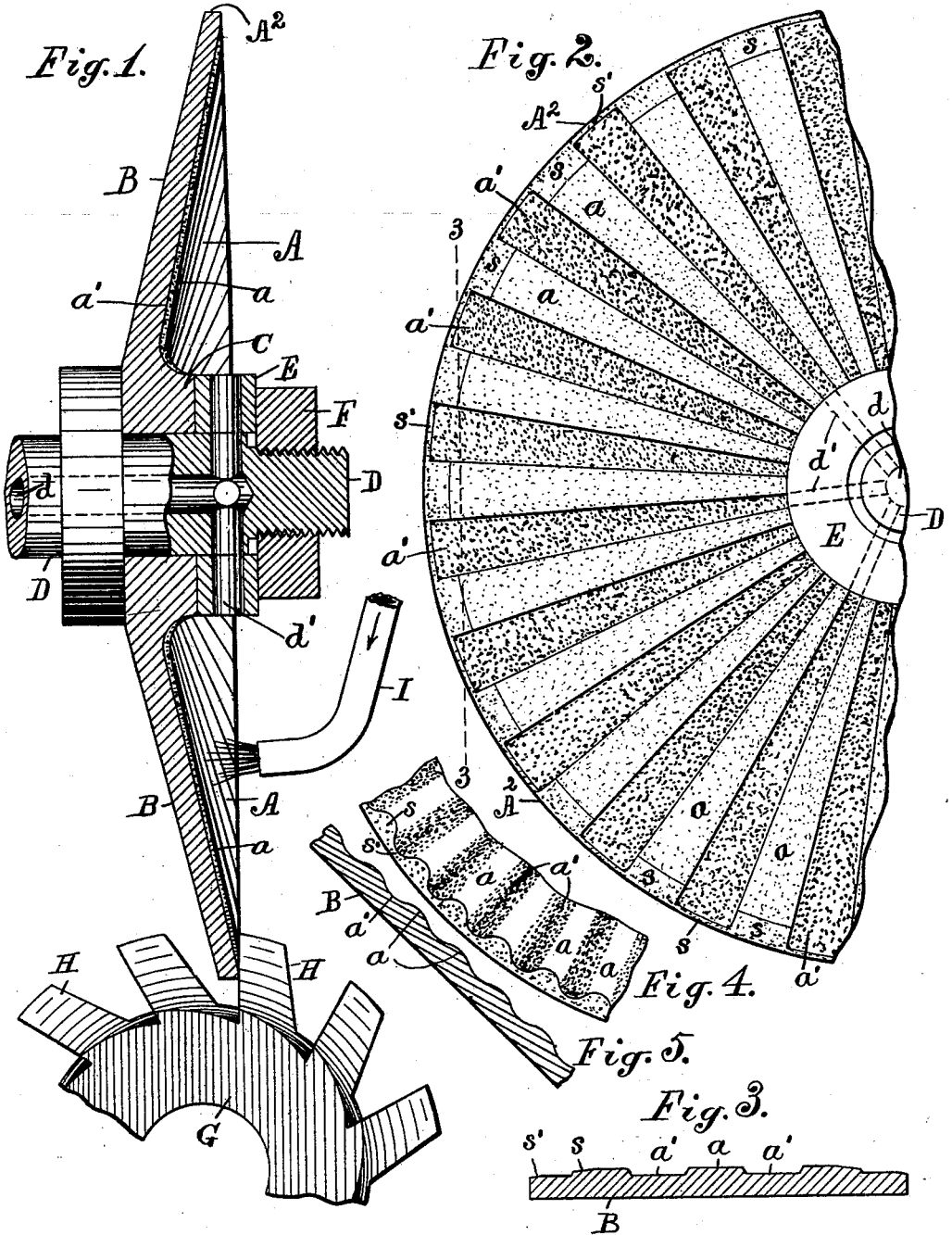

ULRICH EBERHARDT, OF NEWARK, NEW JERSEY.

GRINDING-WHEEL.

SPECIFICATION forming part of Letters Patent No. 622,886, dated April 11, 1899.

Application filed September 24, 1898. Serial No. 691,752. (No model.)

*To all whom it may concern:*

Be it known that I, ULRICH EBERHARDT, a citizen of the United States, residing at Newark, county of Essex, State of New Jersey, have invented certain new and useful Improvements in Grinding-Wheels, fully described and represented in the following specification and the accompanying drawings, forming a part of the same.

The object of the present invention is to improve the means of watering or cooling the side of a grinding-wheel in cases where the wheel is used to produce nearly flat surfaces, and especially where the wheel is formed with a thin edge to fit between the successive teeth of a steel cutter.

The invention consists of a dished grinding-wheel having a series of alternate ridges and grooves upon its concave side and a grinding-face along the periphery of such side intersecting the ridges and grooves at an acute angle. Such grinding-face may be formed at right angles to the axis of the wheel and the seat thus form a plane surface, which is constantly renewed as the wheel is worn. Such seat is of annular character and indented upon the side nearest the axis of the wheel by the grooves in the concave face of the disk, which thus form a series of pockets in the grinding-face and serve to supply the water at rapid intervals to the surface of the object which is being ground.

Where the grinding-surface is continuous, it is obvious that no amount of watering or lubrication can effectively introduce the cooling fluid between the grinding-surface and the object that is being ground; but the projection of the grooves into the annular grinding-seat in the present construction carries the water positively into contact with the object and assists in a very powerful degree in reducing its temperature.

The invention will be understood by reference to the annexed drawings, in which—

Figure 1 is a central section of the wheel, with a part of a cutter having peripheral teeth, the end of the wheel-arbor being shown partly in section where hatched. Fig. 2 shows a part of the concave side of the same wheel, and Fig. 3 a section across the grooves of the same near the periphery on line 3 3 in Fig. 2. Fig. 4 shows a part of the periphery of a wheel with rounded grooves, and Fig. 5 an annular section near the rim of such wheel.

A designates the concave side of the dished grinding-wheel, and B the convex side, which is shown nearly parallel with the side A.

C is a hub formed upon the center of the wheel to impart strength where it is secured upon the arbor D. The latter is shown with a central hole $d$ to introduce water or lubricating fluid, which is distributed radially through holes leading outward by a perforated collar E, which is secured upon the arbor with the wheel by nut F.

In Figs. 2 and 3 the wheel is shown with a series of radial flat-bottomed grooves $a'$, disposed between flat-faced ridges $a$, and the grinding-seat $s\ s'$ is formed upon the periphery of the side A, at right angles to the axis of the wheel, as shown in Fig. 1, and thus intersects the surface of the grooves $a'$ and ridges $a$ at an acute angle. The seat is indented by the grooves $a'$, so that it consists of a narrow marginal portion $s'$ at the ends of the grooves and the projections or tongues $s$, formed by the oblique intersection of the ridges $a$. The cutter G is shown in Fig. 1 with teeth H, one of which has a face extended in a line with the grinding-seat, and could be readily ground when in contact with the revolving seat by moving such seat in a line with the face of the tooth or moving the cutter along the plane of the seat toward the axis of the grinding-wheel. Under these conditions the seat-tongues $s$ form the larger part of the grinding-surface and are alternated with the grooves which supply water to the face of the body or tooth $G'$, and the body is thus incessantly lubricated with the cooling fluid, which is brought into actual contact with the body between the passage of the grinding-surfaces $s$. These conditions also maintain the grinding-seat unalterably at right angles to the axis of the wheel, and the width of the indentations $s'$ upon the seat is also preserved unchangeably, while such wear gradually increases the width of the seat portions $s'$. As the surface of the grinding-seat $s'$ cannot be lubricated like that of the seat $s$, it is desirable to maintain such seat as narrow as possible, and as such wheels are made of artificial abrasive composition the rim $A^2$ may be turned off at intervals by a diamond tool, so as to restrict the width of the seat portion $s'$ within any desired limit.

By making the grooves $a'$ with flat bottom they are of approximately rectangular cross-section, as shown in Fig. 3, and thus carry more water to the object which is being ground than a groove of concave form. Grooves and ridges of curved section are, however, shown in Figs. 4 and 5, and such grooves obviously operate, as well as the rectangular grooves, to indent the grinding-seat and form interspaces which convey the water to the object.

It will be obvious that the grinding-face of this wheel constantly renews itself and that its operation can be kept unchanged by turning off the rim $A^2$ at intervals.

It is found that such a grinding-wheel can be operated at a much greater speed and with a heavier cut than wheels which present a continuous grinding seat or surface to the object, as any efficient lubrication of the surface in contact with such a continuous seat is almost impossible, and a high speed thus heats the object injuriously.

It is immaterial to this invention how the lubricating fluid is supplied to the wheel, and a jet I is shown in Fig. 1 projected toward the grooved side A of the wheel, which is equally efficient, with the central water-discharge, to feed the grooves with water, so that they may supply continuously the water-pockets which they form in the grinding-seat.

The grooves $a'$ are shown radial and sector shaped; but they may be arranged in any manner to form pockets in the peripheral grinding-seat and supply the same with water.

Having thus set forth the nature of the invention, what is claimed herein is—

1. A dished grinding-wheel having a series of alternate ridges and grooves upon its concave side, and a grinding-face along the periphery of such side, intersecting the ridges and grooves at an acute angle, as and for the purpose set forth.

2. A dished grinding-wheel having a series of alternate ridges and grooves upon its concave side, and a grinding-face at right angles to the axis of the wheel, forming, by an acute intersection of the ridges and grooves, a series of alternate grinding-seats and water-pockets, as and for the purpose set forth.

3. A dished grinding-wheel having a series of alternate ridges and grooves upon its concave side, and a grinding-face at right angles to the axis of the wheel, forming, by an acute intersection of the ridges and grooves, a grinding-seat along the periphery of such side with the grooves projecting therein and forming a series of water-pockets in such seat, substantially as herein set forth.

4. A dished grinding-wheel having upon its concave side a series of flat-bottomed grooves extended from the hub to the periphery, as and for the purpose set forth.

In testimony whereof I have hereunto set my hand in the presence of two subscribing witnesses.

ULRICH EBERHARDT.

Witnesses:
F. L. EBERHARDT,
THOMAS S. CRANE.